United States Patent
Song et al.

(10) Patent No.: US 9,983,344 B2
(45) Date of Patent: May 29, 2018

(54) DISPLAY DEVICE

(71) Applicant: Samsung Display Co., Ltd., Yongin-Si, Gyeonggi-Do (KR)

(72) Inventors: Min-young Song, Asan-si (KR); Eunju Nam, Seoul (KR); Young-min Park, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days. days.

(21) Appl. No.: 15/419,318

(22) Filed: Jan. 30, 2017

(65) Prior Publication Data

US 2017/0242183 A1    Aug. 24, 2017

(30) Foreign Application Priority Data

Feb. 23, 2016  (KR) .................. 10-2016-0021381

(51) Int. Cl.
  *G02F 1/136* (2006.01)
  *F21V 8/00* (2006.01)
  *G02F 1/1335* (2006.01)

(52) U.S. Cl.
  CPC .......... *G02B 6/0053* (2013.01); *G02B 6/005* (2013.01); *G02B 6/0055* (2013.01); *G02F 1/133512* (2013.01); *G02F 1/133617* (2013.01); *G02F 1/133621* (2013.01); *G02F 2001/133607* (2013.01); *G02F 2001/133614* (2013.01)

(58) Field of Classification Search
  CPC ............. G02F 1/133616; G02F 1/1323; G02F 1/133524; G02F 1/133615; G02B 6/0068
  See application file for complete search history.

(56) References Cited

U.S. PATENT DOCUMENTS

| | | | |
|---|---|---|---|
| 5,126,882 A | 6/1992 | Oe et al. | |
| 2014/0085570 A1* | 3/2014 | Kuwata | G02B 6/0053 349/65 |
| 2014/0160408 A1 | 6/2014 | Cho et al. | |

FOREIGN PATENT DOCUMENTS

| | | |
|---|---|---|
| JP | 2010262060 A | 11/2010 |
| JP | 2012103489 A | 5/2012 |
| KR | 1020090025590 A | 3/2009 |
| KR | 1020100116079 A | 10/2010 |
| KR | 1020150044112 A | 4/2015 |

* cited by examiner

*Primary Examiner* — Phu Vu
(74) *Attorney, Agent, or Firm* — Cantor Colburn LLP

(57) ABSTRACT

A display device includes a display panel and a backlight unit which is disposed below the display panel, provides light to the display panel, and includes a light guide member including a light emission surface, a reflection surface, and a plurality of side surfaces which connect the light emission surface to the reflection surface, where the plurality of side surfaces includes a first side surface which receives light and a second side surface facing the first side surface in a first direction, a light source which provides the light to the first side surface, an optical path adjustment member disposed on the light guide member and including a flat portion, a plurality of protruding portions protruding from the flat portion in a direction of the light guide member, and a light blocking layer disposed on the plurality of protruding portions, and a prism sheet disposed on the flat portion.

16 Claims, 10 Drawing Sheets

DISPLAY DEVICE

This application claims priority to Korean Patent Application No. 10-2016-0021381, filed on Feb. 23, 2016, and all the benefits accruing therefrom under 35 U.S.C. § 119, the content of which in its entirety is herein incorporated by reference.

BACKGROUND

1. Field

Exemplary embodiments of the invention herein relate to a display device, and more particularly, to a photo luminescent display device.

2. Description of the Related Art

In general, a photo luminescent display device is a type of a display device in which a conventional color filter is replaced by a light excitation member. The photo luminescent display device displays an image using visible light generated when light having a low wavelength band, which is generated from a light source and controlled by a light crystal layer, is provided to a color conversion layer.

SUMMARY

After light outputted from a light source is controlled by a liquid crystal layer, a phenomenon, in which the light is not incident into a color conversion layer disposed on a corresponding area, but incident into a color conversion layer disposed on a different area, may occur. In this case, since the light controlled by the liquid crystal layer is not incident into the color conversion layer disposed on the corresponding area, but incident into the color conversion layer disposed on the different area, display quality may be deteriorated in partial sections.

Exemplary embodiments of the invention provide a display device including an optical path adjustment member that controls light controlled by a liquid crystal layer so that the light is provided to a corresponding area of a color conversion layer.

An exemplary embodiment of the invention provides a display device including a display panel, and a backlight unit disposed below the display panel to provide light to the display panel, where the backlight unit includes a light guide member including a light emission surface, a reflection surface, and a plurality of side surfaces which connect the light emission surface to the reflection surface, where the plurality of side surfaces includes a first side surface which receives light and a second side surface facing the first side surface in a first direction, a light source which provides the light to the first side surface, an optical path adjustment member disposed on the light guide member and including a flat portion, a plurality of protruding portions protruding from the flat portion in a direction of the light guide member, and a light blocking layer disposed on the plurality of protruding portions, and a prism sheet disposed on the flat portion, where each of the plurality of protruding portions includes a first surface connected to the flat portion and a second surface which is disposed farther from the first side surface than the first surface in the first direction, connected to the flat portion, and has an acute angle with respect to the light emission surface, and the light blocking member is disposed on at least the second surface.

In an exemplary embodiment, the first surface may have a right angle with respect to the light emission surface.

In an exemplary embodiment, the acute angle may range from about 5 degrees to about 60 degrees.

In an exemplary embodiment, the plurality of protruding portions may be arranged in the first direction, and the first direction and a second direction crossing the first direction may define the light emission surface, and a thickness direction of the optical path adjustment member may be defined as a third direction perpendicular to the first and second directions, and the plurality of protruding portions may have the same shape with each other in a cross-section defined by the first and third directions.

In an exemplary embodiment, each of the plurality of protruding portions may have an acute-angled triangular shape.

In an exemplary embodiment, each of the plurality of protruding portions may further include a third surface which connects the first surface to the second surface and contacts the light emission surface.

In an exemplary embodiment, the third surface may have a trapezoid shape.

In an exemplary embodiment, adjacent protruding portions of the plurality of protruding portions may be spaced apart from each other by a predetermined distance in the first direction, and predetermined distances between adjacent protruding portions of the plurality of protruding portions may be the same with each other.

In an exemplary embodiment, the light blocking layer may include at least one of carbon black, iron oxide, chromium oxide, zirconium oxide, zinc or cerium oxide, manganese violet, blue ultramarine, chromium hydrates, and iron blue.

In an exemplary embodiment, the prism sheet may include a reverse prism sheet.

In an exemplary embodiment, the reverse prism sheet may include a support member, and a plurality of prism mountains protruding in a direction of the optical path adjustment member on a plane of the support member.

In an exemplary embodiment, each of the plurality of prism mountains may include a first inclined surface connected to the support member and having a first acute angle with respect to the flat portion, and a second inclined surface disposed farther from the first side surface than the first inclined surface in the first direction, connected to the support member, and having a second acute angle with respect to the flat portion.

In an exemplary embodiment, the plurality of prism mountains may be arranged in the first direction, and the first direction and a second direction crossing the first direction may define the flat portion, and a thickness direction of the reverse prism sheet may be defined as a third direction perpendicular to the first and second directions, and the plurality of prism mountains may have the same shape with each other in a cross-section defined by the first and third direction.

In an exemplary embodiment, each of the plurality of prism mountains may have an acute-angled triangular shape.

In an exemplary embodiment, the display panel may include a first substrate disposed on the backlight unit, a display layer disposed on the first substrate, a color conversion layer disposed on the display layer and including a light excitation material, and a second substrate disposed on the display layer.

In an exemplary embodiment, the light source may generate blue light.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1:
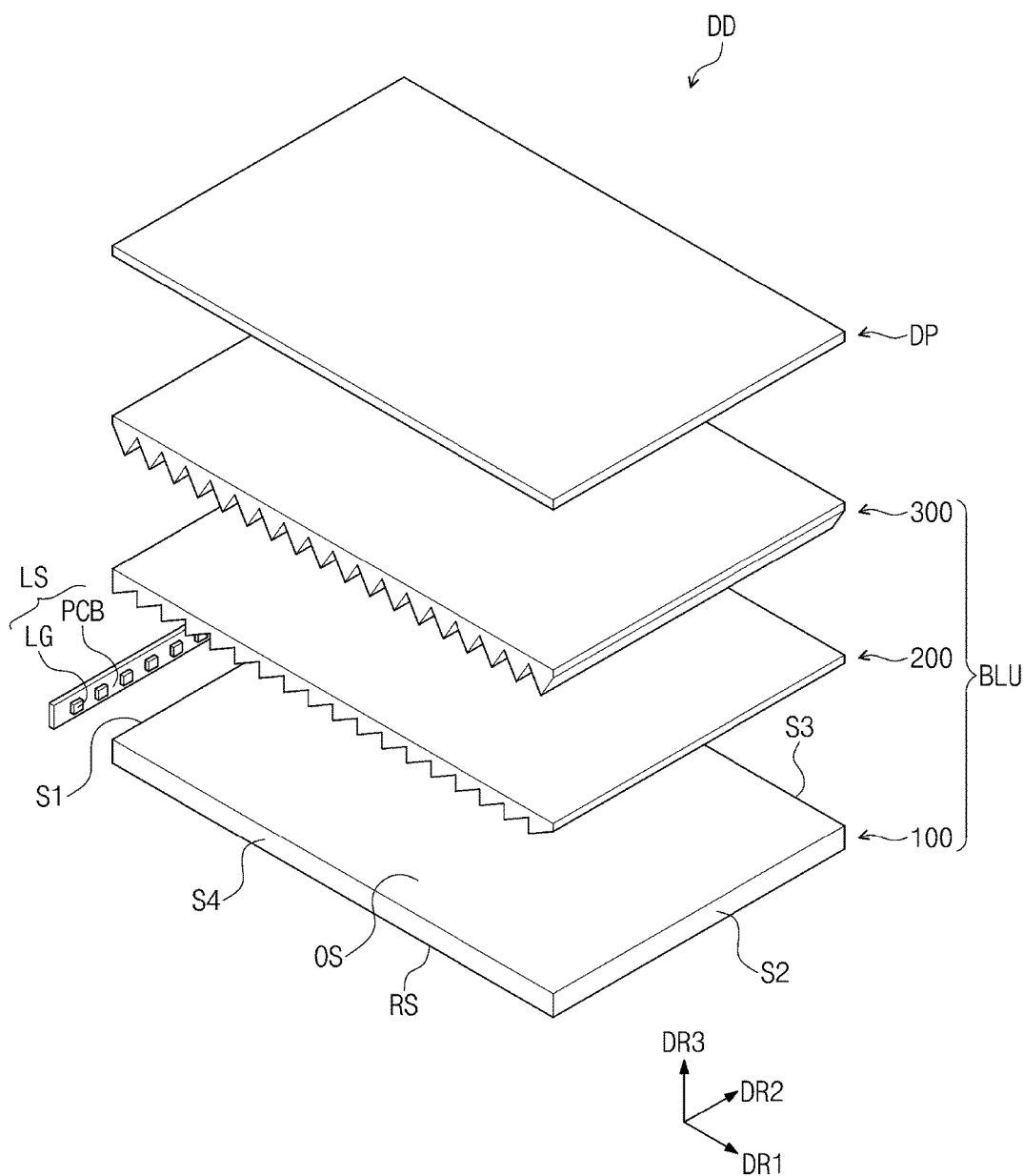
FIG. 1 is an exploded perspective view of an exemplary embodiment of a display device according to the invention.

Since the present disclosure may have diverse modified embodiments, specific exemplary embodiments are illustrated in the drawings and are described in the detailed description of the invention. However, this does not limit the present disclosure to the specific exemplary embodiments and it should be understood that the present disclosure covers all the modifications, equivalents, and replacements within the idea and technical scope of the present disclosure.

Like reference numerals refer to like elements throughout. In the drawings, the dimensions and size of each structure are exaggerated or reduced for convenience in description and clarity. It will be understood that although the terms such as 'first' and 'second' are used herein to describe various elements, these elements should not be limited by these terms. The terms are only used to distinguish one component from other components. For example, a first element referred to as a first element in one embodiment can be referred to as a second element in another exemplary embodiment without departing from the scope of the appended claims. The terms of a singular form may include plural forms unless referred to the contrary.

The meaning of "include" or "comprise" specifies a property, a region, a fixed number, a step, a process, an element and/or a component but does not exclude other properties, regions, fixed numbers, steps, processes, elements and/or components.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

FIG. 1 is an exploded perspective view of a display device according to an exemplary embodiment of the invention. Referring to FIG. 1, a display device DD may include a backlight unit BLU and a display panel DP.

The backlight unit BLU may output light having a predetermined wavelength band. According to an exemplary embodiment, an example in which the backlight unit BLU outputs blue light will be described. In an exemplary embodiment, the backlight unit BLU may output light having a wavelength band of about 200 nanometers (nm) to about 400 nm, for example. However, the exemplary embodiment of the invention is not limited thereto. In another exemplary embodiment, the backlight unit BLU may output ultraviolet rays, for example.

In detail, the backlight unit BLU includes a light source LS, a light guide member 100, an optical path adjustment member 200, and a reverse prism sheet 300.

The light source LS may generate light to output the generated light to the light guide member 100. The light source LS may include a plurality of light emitting devices LG and a circuit board PCB including one surface on which the plurality of light emitting devices LG are disposed (e.g., mounted) and applying power to the light emitting devices LG. The light emitting devices LG may be spaced apart from each other on the circuit board PCB in a first direction DR1. In an exemplary embodiment, the light emitting devices LG may be light emitting diodes ("LEDs"), for example. However, the invention is not limited thereto, and the light emitting devices LG may include various other types of light emitting devices. In an exemplary embodiment, the circuit board PCB may have a rectangular shape, for example, when viewed in the first direction DR1.

According to an exemplary embodiment, the light source LS may face one side surface of side surfaces of a light guide member 100, thereby transmitting light to the one side surface. The light source LS according to an exemplary embodiment of the invention may be disposed on only one side surface of the side surfaces of the light guide member 100.

The light guide member 100 includes first to fourth side surfaces S1 to S4, a light emission surface OS, and a reflection surface RS. The first side surface S1 and the second side surface S2 may face each other in the first direction DR1, and the third side surface S3 and the fourth side surface S4 may face each other in a second direction DR2. According to an exemplary embodiment, the first side surface S1 may face the light source LS, and light may be incident from the light source LS into the first side surface S1.

The light emission surface OS and the reflection surface RS may face each other in a third direction DR3. The light emission surface OS may be defined in the first and second directions DR1 and DR2 to face the optical path adjustment member 200 in the third direction DR3. The reflection surface RS may be defined in the first and second directions DR1 and DR2 to face the light emission surface OS in the third direction DR3.

Also, although not shown, the backlight unit BLU may further include a reflection sheet disposed on the reflection surface RS. The reflection sheet may reflect light that leaks without traveling to the display panel DP to change a path of the light so that the light travels in the third direction DR3, i.e., the display panel DP. Thus, the reflection sheet may increase an amount of light provided to the display panel DP.

The light guide member 100 may guide the light incident through the first side surface S1 toward the display panel DP. That is, the light incident into the first side surface S1 may be outputted to the display panel DP through the light emission surface OS.

The light guide member 100 is not specifically limited when the light guide member is generally used. In an exemplary embodiment, the light guide member 100 may include or be comprised of a transparent polymer member such as polycarbonate or polymethyl methacrylate.

The optical path adjustment member 200 may be disposed above the light guide member 100 to receive light from the light emission surface OS. In this case, the light outputted through the light emission surface OS may be provided to the optical path adjustment member 200 at various angles.

According to an exemplary embodiment of the invention, the optical path adjustment member 200 may transmit only light outputted at a predetermined angle with respect to the light emission surface OS to the reverse prism sheet 300. In an exemplary embodiment, the predetermined angle may be an acute angle, for example. That is, the light outputted from the light emission surface OS over the predetermined angle may not be transmitted to the reverse prism sheet 300. The optical path adjustment member 200 will be described in detail with reference to FIG. 4.

The reverse prism sheet 300 is disposed above the optical path adjustment member 200. The reverse prism sheet 300 collects light passing through the optical path adjustment member 200 into the display panel DP. In general, the reverse prism sheet may not transmit the light to the display panel DP in the third direction DR3 when the light is incident at an angle equal to or greater than a predetermined angle on a plane of the optical path adjustment member 200. The reverse prism sheet 300 according to an exemplary embodiment of the invention may receive only light outputted at an angle within a predetermined range on the plane of the optical path adjustment member 200. As a result, the reverse prism sheet 300 may transmit light to the display panel DP in the third direction DR3. The reverse prism sheet 300 will be described in detail with reference to FIG. 5.

The display panel DP may be disposed on the reverse prism sheet 300 to receive light from the reverse prism sheet 300. According to an exemplary embodiment of the invention, the display panel DP may include a color conversion layer including a photo luminescent material. Hereinafter, a photo luminescent display device will be described as an example of the display device DD according to an exemplary embodiment of the invention.

In detail, the display panel DP is parallel to a plane defined by the first and second directions DR1 and DR2. A normal direction of the display panel DP is defined in a third direction DR3. The third direction DR3 defines a thickness direction of the display device DD. Front and rear surfaces of each of the members are defined by an upper direction and a lower direction of the third direction DR3. However, directions indicated in the directions DR1, DR2, and DR3 may be a relative concept and thus changed into different directions.

Also, in an exemplary embodiment, for example, the display panel DP may include a liquid crystal display ("LCD") panel, an electrophoretic display panel, and an electrowetting display panel. Hereinafter, although an LCD panel is described as an example of the display panel 200 according to an exemplary embodiment of the invention, various display panels may be applied as described above.

Figure 2:
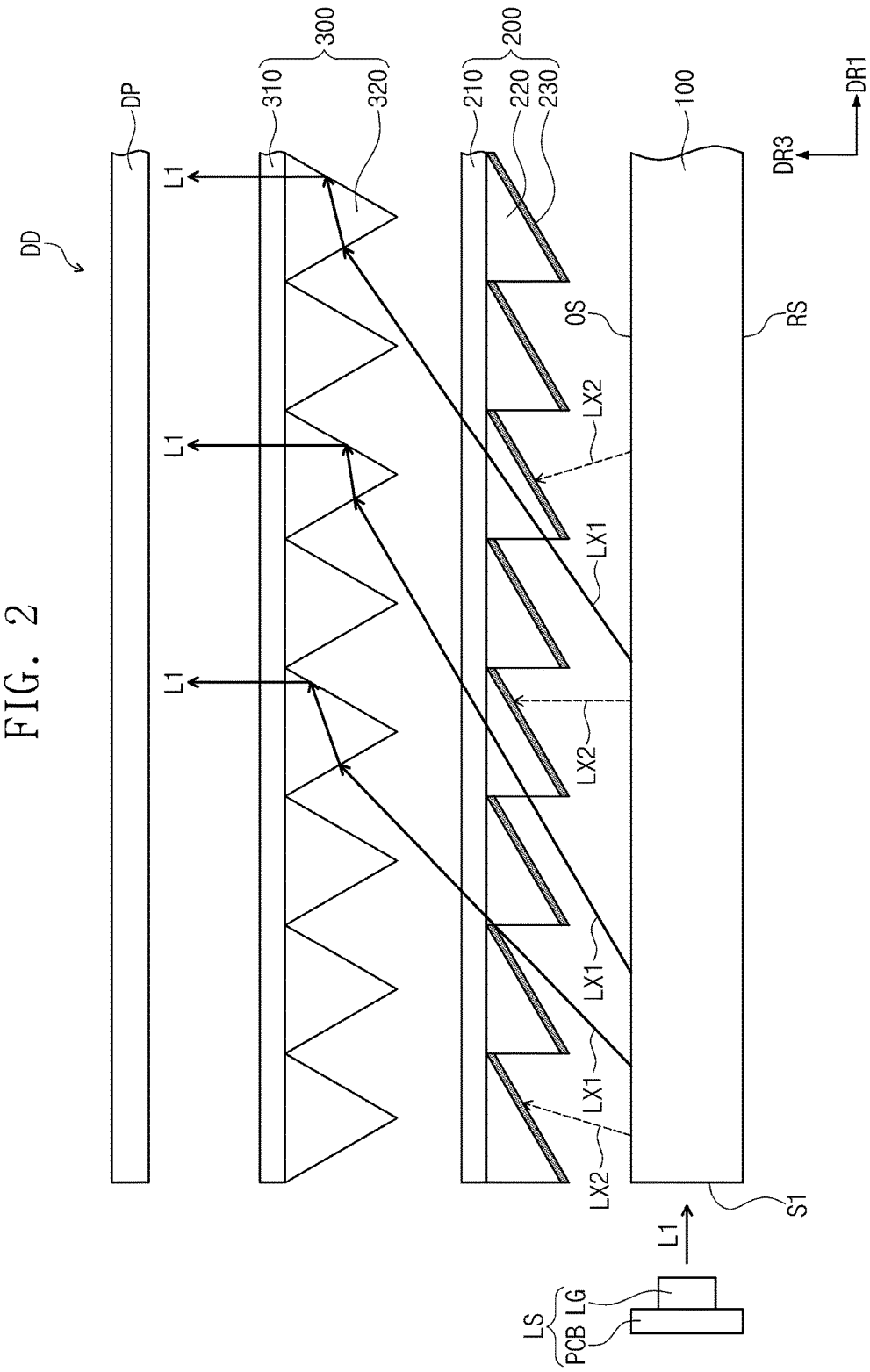
FIG. 2 is a cross-sectional view of the display device of FIG. 1 in a second direction.

FIG. 2 is a cross-sectional view of the display device of FIG. 1 in a second direction DR2.

Referring to FIG. 2, light L1 outputted from the light source LS may be incident into the first side surface S1 of the light guide member 100. The light guide member 100 may guide the light L1 incident into the first side surface S1 to the display panel DP. The light L1 guided to the display panel DP may be outputted at various angles through the light emission surface OS.

The optical path adjustment member 200 may include a flat portion 210, a plurality of protruding portions 220 protruding from the flat portion 210 to the light guide member 100, and a light blocking layer 230 disposed on the plurality of protruding portions 220.

The protruding portions 220 may have the same shape with each other in a cross-section defined by the first and third directions DR1 and DR3. In an exemplary embodiment, each of the protruding portions 220 may have a right-angled triangular shape, for example.

The light blocking layer 230 may be disposed on inclined surfaces of the protruding portions 220. According to an exemplary embodiment, the light blocking layer 230 may block light transmitted from the light emission surface OS to the reverse prism sheet 300.

According to an exemplary embodiment, the protruding portions 220 may allow only light outputted from the light emission surface OS at a predetermined angle and in a predetermined direction to pass therethrough. In an exemplary embodiment, the predetermined angle may be an acute angle, for example. Also, the predetermined direction may be a direction that is away from the first side surface S1 in the first direction DR1.

In an exemplary embodiment, first light LX1 outputted from the light emission surface OS at a predetermined angle and in a predetermined direction may be transmitted to the reverse prism sheet 300, for example. Second light LX2 outputted from the light emission surface OS at an angle greater than the predetermined angle may not be transmitted to the reverse prism sheet 300 by the light blocking layer 230.

The reverse prism sheet 300 may receive light transmitted from the optical path adjustment member 200 to transmit the light to the display panel DP. According to an exemplary embodiment, the reverse prism sheet 300 includes a support member 310 and a plurality of prism mountains 320 protruding from the support member 310 in a direction of the optical path adjustment member 200. The prism mountains 320 may totally reflect the light incident from the optical path adjustment member 200 to transmit the light to the display panel DP.

Figure 3:
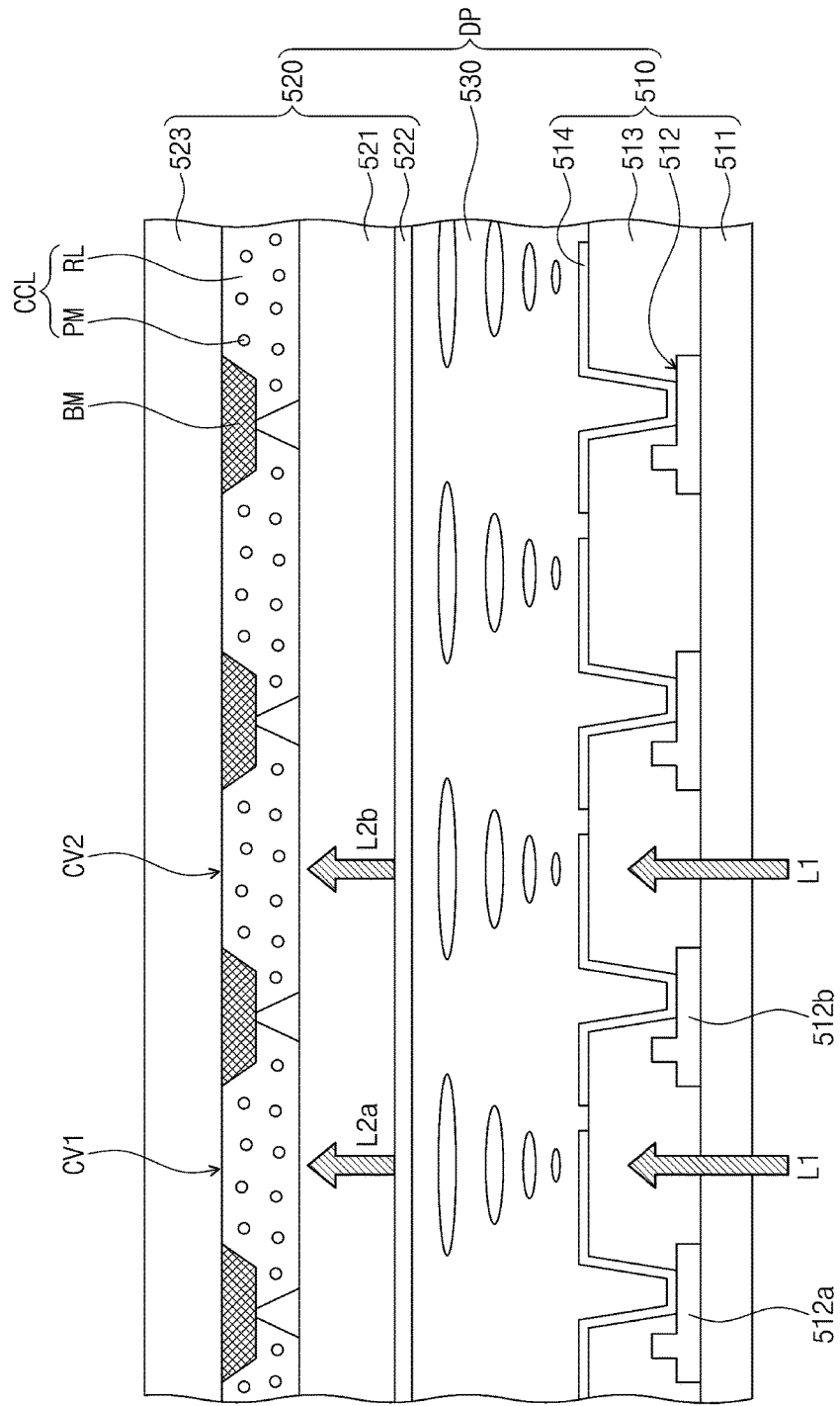
FIG. 3 is a cross-sectional view of a display panel of FIG. 1.

FIG. 3 is a cross-sectional view of the display panel of FIG. 1.

Referring to FIGS. 1 and 3, the display panel DP includes a first substrate 510, a second substrate 520, and a display layer 530 disposed between the first substrate 510 and the second substrate 520. In an exemplary embodiment, the display layer 530 may be provided as a liquid crystal layer, for example. The display layer 530 may adjust transmittance of light transmitted from the backlight unit BLU to display an image.

The first substrate 510 includes a first transparent substrate 511, a switching device 512, an insulation layer 513, and a pixel electrode 514. The first transparent substrate 511 is provided, and the switching device 512 is disposed on a pixel area on the first transparent substrate 511. Although not shown, the display device DD may include a display area on which an image is displayed and a non-display area on which driving devices are disposed. Here, the pixel area may be defined as an area, on which at least one pixel is disposed, of the display area.

The insulation layer 513 may cover the switching device 512 and expose a portion of an electrode of the switching device 512. The pixel electrode 514 may be disposed on the insulation layer 513 and electrically connected to a portion of the electrode of the switching device 512, which is exposed by the insulation layer 513.

Also, in an exemplary embodiment, for example, the first substrate 510 may further include a gate line disposed on the first transparent substrate 511 to extend in the first direction DR1 and a data line disposed on the first transparent substrate 511 to extend in the second direction DR2 crossing the first direction DR1. In another exemplary embodiment, for example, the first substrate 510 may further include a data line disposed on the first transparent substrate 511 to extend in the first direction DR1 and a gate line disposed on the first transparent substrate 511 to extend in the second direction DR2 crossing the first direction DR1.

The switching device 512 may include a thin film transistor ("TFT") including a source electrode, a drain electrode, and a gate electrode. In an exemplary embodiment, the TFT may have a bottom-gate structure in which the gate electrode is disposed at a lower side, and the source and drain electrodes are disposed at an upper side, for example. In another exemplary embodiment, the TFT may have a top-gate structure in which the source and drain electrodes are disposed at a lower side, and the gate electrode is disposed at an upper side, for example.

The second substrate 520 may include a second transparent substrate 521, a common electrode 522, a third transparent substrate 523, and a color conversion layer CCL. The common electrode 522 is disposed on a bottom surface of the second transparent substrate 521. The third transparent substrate 523 is disposed above the second transparent substrate 521. The color conversion layer CCL may be disposed between the second transparent substrate 521 and the third transparent substrate 523.

Also, the second substrate 520 further includes a black matrix BM. The black matrix BM may overlap a portion of the color conversion layer CCL. The black matrix BM may overlap a light blocking area of the first substrate 510. The switching device 512, the gate lines, and the data lines may be disposed on the light blocking area.

Although the structure in which the second substrate 520 includes both of the second transparent substrate 521 and the third transparent substrate 523 is described, the technical ideas of the invention are not limited thereto. In an exemplary embodiment, when the second substrate 520 includes only the second transparent substrate 521, the third transparent substrate 523 may be omitted, for example. In an alternative exemplary embodiment, when the second substrate 520 includes only the third transparent substrate 523, the second transparent substrate 521 may be omitted, for example.

The second substrate 520 may further include a polarizing film (not shown) disposed between the second transparent substrate 521 and the color conversion layer CCL. Each of the second and third transparent substrates 521 and 523 is not particularly limited to a material thereof when the formation materials are commonly used. In an exemplary embodiment, each of the second and third transparent substrates 521 and 523 may include glass, plastic, crystal, or an organic polymer, for example.

The common electrode 522 may include a transparent conductive material and receive a common voltage.

The color conversion layer CCL may convert light controlled by the display layer 530 to output visible light having a predetermined color. The color conversion layer CCL may include a resin layer RL and a light excitation member PM provided in the resin layer RL. Although not shown, the resin layer RL may further include a scattering member.

The resin layer RL is not particularly limited to a material thereof when the material for forming the resin layer RL is commonly used. In an exemplary embodiment, the resin layer RL may include a silicon resin or a photoresist resin, for example. The light excitation member PM may absorb light having a predetermined wavelength band and thus be in an excited state and then return to a ground state to emit the absorbed optical energy. The light excitation member PM includes a phosphor or a quantum dot. In an exemplary embodiment, the light excitation member PM may include oxynitride, nitride, silicate, aluminated, scandate, or oxyfluoride materials, for example.

In an exemplary embodiment, when the light excitation member PM is a phosphor and includes CaAlSiN3:Eu, (Sr,Ca)AlSiN3:Eu, or CaAlSi(ON)3:Eu, the light excitation member PM may emit excitation light having a red wavelength band, for example.

In an exemplary embodiment, when the light excitation member PM is a phosphor and includes β-SiAlON (Si6-zALzOzN8-z), (Ba,Sr)2SiO4:Eu, or CaSc2O:Ce, the light excitation member PM may emit excitation light having a green wavelength band, for example.

In an exemplary embodiment, when the light excitation member PM is a phosphor and includes Y3Al5O12:Ce or Tb3Al5O12:Ce, the light excitation member PM may emit excitation light having a yellow wavelength band, for example. When blue light is provided from the backlight unit BLU, and the light excitation member PM is a phosphor and includes Y3Al5O12:Ce or Tb3Al5O12:Ce, excitation light emitted from the light excitation member PM and the blue light may be combined to emit white light.

In an exemplary embodiment, when the light excitation member PM is a quantum dot, the light excitation member PM may be II-VI-based quantum dots including CdSe/ZnS, CdSe/CdS/ZnS, ZnSe/ZnS, or ZnTe/ZnSe, for example. In an exemplary embodiment, the light excitation member PM may be III-V-based quantum dots including InP/ZnS or quantum dots including CuInS(2)/ZnS, for example. When the light excitation member PM includes a quantum dot, the wavelength band of the excited light may vary according to a size of the quantum dot. In an exemplary embodiment, the excited light of the quantum dot may be red, green, or blue light according to the size of the quantum dot, for example.

The scattering member (not shown) scatters the excited light emitted from the light excitation member PM. In an exemplary embodiment, the scattering member (not shown) may include titanium oxide or silicon oxide, for example. In an exemplary embodiment, the scattering member (not shown) may include TiO2 or SiO2, for example.

First light L1 may be provided from the backlight unit BLU to the first substrate 510. Thereafter, the first light L1 may be converted into second light L2a/L2b (refer to FIG. 3) by a control of the display layer 530 to provide the second light to the color conversion layer CCL. In this case, the second light controlled by the display layer 530 is desired to be provided to an area of the color conversion layer CCL corresponding to each pixel area. That is, the second light may be emitted with different intensities from the display layer 530 to correspond to each pixel area.

In an exemplary embodiment, the display layer 530 may convert the intensity of the first light L1 into an intensity of second light L2a on the basis of a difference in voltage between a first switching device 512a and the common electrode 522, for example. As a result, the display layer 530 provides the second light L2a to a first color conversion area CV1 overlapping the first pixel area corresponding to the first switching device 512a.

In an exemplary embodiment, the display layer 530 may convert the intensity of the first light L1 into an intensity of second light L2b on the basis of a difference in voltage between the second switching device 512b and the common electrode 522, for example. As a result, the display layer 530 provides the second light L2b to a second color conversion area CV2 overlapping the second pixel area corresponding to the second switching device 512b.

Figure 4:
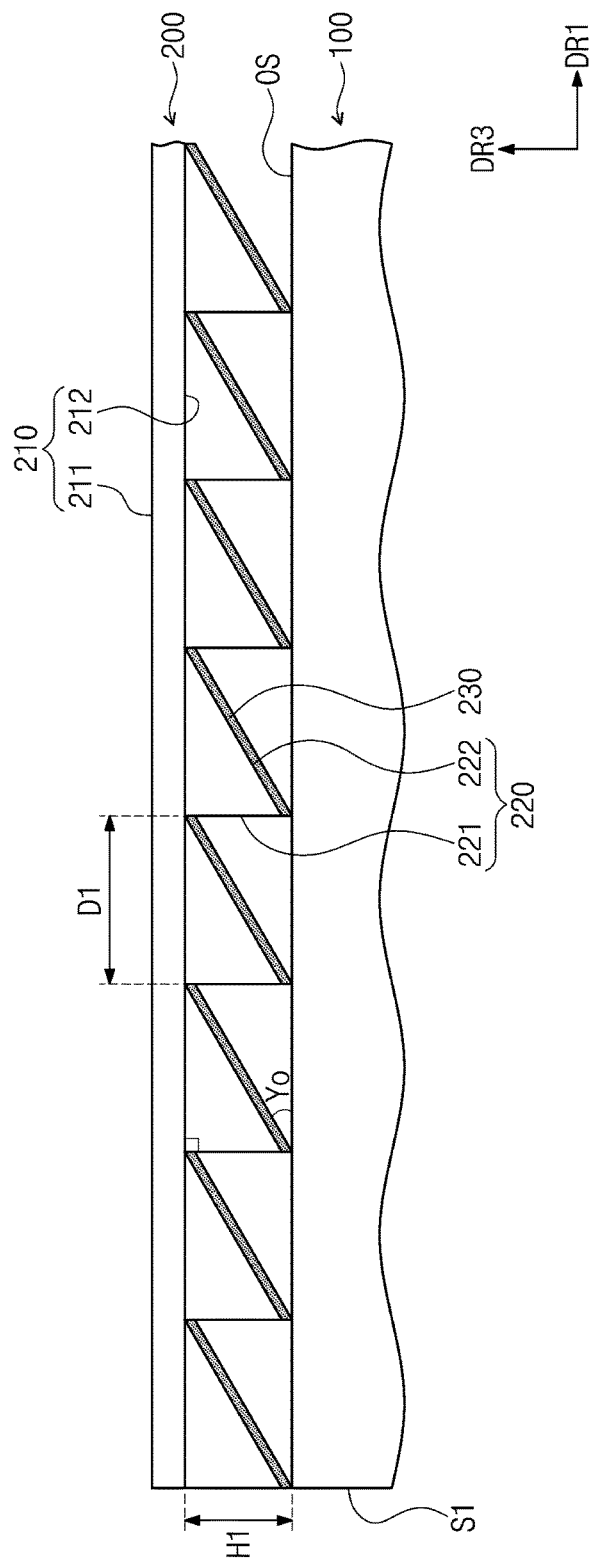
FIG. 4 is a cross-sectional view of an optical path adjustment member of FIG. 1.

FIG. 4 is a cross-sectional view of the light guide member and the optical path adjustment member of FIG. 1.

FIG. 4 illustrates the optical path adjustment member 200 on the cross-section defined by the first and third directions DR1 and DR3. Hereinafter, the cross-section defined by the first and third directions DR1 and DR3 in FIG. 4 will be described.

The optical path adjustment member 200 may include a flat portion 210, a plurality of protruding portions 220, and a light blocking layer 230.

The flat portion 210 may include a top surface 211 and a bottom surface 212. Each of the protruding portions 220 may have a shape that protrudes from the bottom surface 212 in the third direction DR3, i.e., in a direction perpendicular to an extension direction of the light guide member 100. In an exemplary embodiment, each of the flat portion 210 and the protruding portions 220 may include at least one of an acrylic-based resin, a fluorine-based resin, a silicon-based resin, a polycarbonate-based resin, a polyamide-based resin, a polystyrene-based resin, a polyvinyl chloride-based resin, a polyester-based resin, a polyolefin-based resin, a polyethylene-based resin, a polypropylene-based resin, and a polybutylene-based resin, for example.

Each of the protruding portions 220 includes a first surface 221 and a second surface 222. The first surface 221 may be connected to the bottom surface 212 and have a right angle with respect to the bottom surface 212. The first surface 221 may protrude by a first height H1 from the bottom surface 212 in the third direction DR3 that is perpendicular to the bottom surface 212. Light emitted from the light emission surface OS may be transmitted to the reverse prism sheet 300 through the first surface 221.

The second surface 222 may be connected to the first bottom surface 212 and disposed farther from the first side surface S1 than the first surface 221 in the first direction DR1. The second surface 222 may have a first angle Yo with respect to the light emission surface OS. According to an exemplary embodiment, the first angle Yo may be an acute angle and substantially range from about 5 degrees to about 60 degrees, for example. An amount of light provided from the light emission surface OS to the reverse prism sheet 300 may vary according to the first angle Yo.

In detail, the second surface 222 may be inclined from one end of the first surface 221 protruding by the first height H1 toward the bottom surface 212 in the first and third directions DR1 and DR3. That is, an angle between the light emission surface OS and the second surface 222 inclined to the bottom surface 212 in the first and third directions DR1 and DR3 may be the first angle Yo. Also, a pitch between the first surface 221 and the second surface 222 in the first direction DR1 may be defined as a first distance D1.

According to an exemplary embodiment, the protruding portions 220 may have the same shape. As illustrated in FIG. 4, each of the protruding portions 220 according to an exemplary embodiment of the invention may have a right-angled triangular shape. According to another exemplary embodiment, each of the protruding portions 220 may have an acute-angled triangular shape.

Also, according to an exemplary embodiment of the invention, the flat portion 210 and a protruding pattern mold may be provided in a process of forming the optical path adjustment member 200. The protruding pattern mold may be a mold for forming the plurality of protruding portions 220 and have a shape corresponding to the plurality of protruding portions to be formed. Thereafter, the flat portion 210 and the protruding pattern mold may be coupled to each other, and then, a resin may be filled into a space between the flat portion 210 and the protruding pattern mold. Then, processes such as squeezing and curing may be performed to demold the flat portion 210 and the protruding pattern mold. Thus, since the cured resin is coupled to the flat portion 210, the plurality of protruding portions 220 may be formed.

According to another exemplary embodiment, the flat portion 210 and the plurality of protruding portions 220 may be integrated with each other. In this case, a mold structure for forming the optical path adjustment member 200 may be prepared, and then, a resin may be injected into the mold structure and cured to form the independent optical path adjustment member 200.

The light blocking layer 230 may be disposed on the second surface 222 to block light outputted from the light guide member 100 to the second surface 222. The light blocking layer 230 may block light, which has an angle greater than the first angle Yo, of the light outputted from the light emission surface OS to prevent the light from being transmitted to the reverse prism sheet 300.

In an exemplary embodiment, the light blocking layer 230 may include at least one of carbon black, iron oxide, chromium oxide, zirconium oxide, zinc or cerium oxide, manganese violet, blue ultramarine, chromium hydrates, and iron blue, for example.

As described above, the optical path adjustment member 200 may transmit only light, which has an angle ranging within the first angle Yo, of the light outputted from the light emission surface OS to the reverse prism sheet 300. As a result, only the light having an angle within a predetermined range may be provided from the optical path adjustment member 200 to the reverse prism sheet 300. As a result, the light perpendicular to the extension direction of the display panel DP may be collected from the reverse prism sheet 300.

Figure 5:
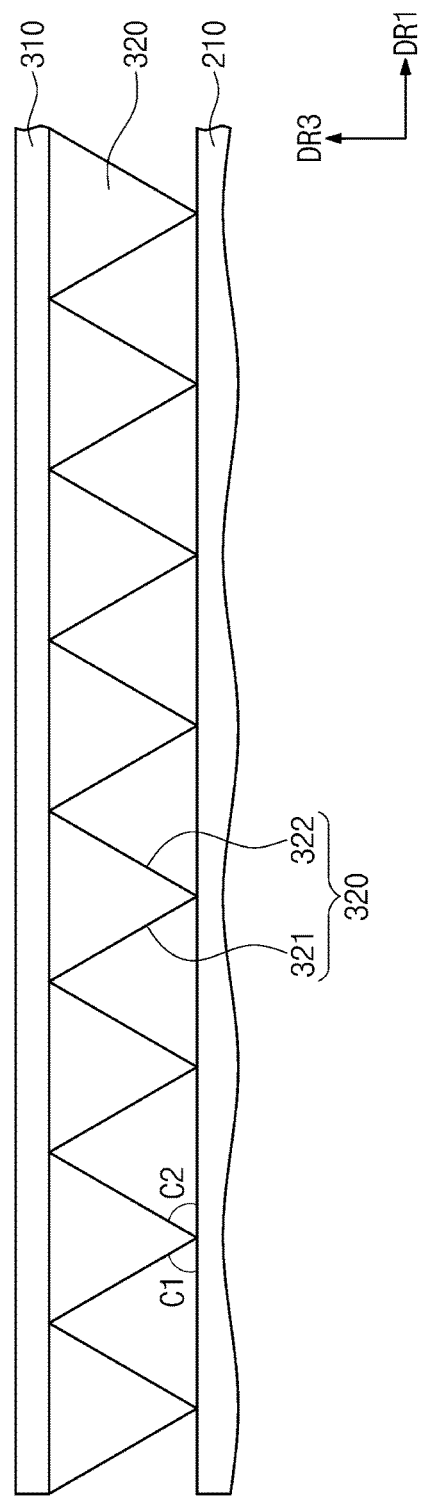
FIG. 5 is a cross-sectional view of a reverse prism sheet of FIG. 1.

FIG. 5 is a cross-sectional view of the optical path adjustment member 200 and the reverse prism sheet 300 of FIG. 1.

FIG. 5 illustrates the reverse prism sheet 300 (refer to FIGS. 1 and 2) on the cross-section defined by the first and third directions DR1 and DR3. Hereinafter, the cross-section defined by the first and third directions DR1 and DR3 in FIG. 5 will be described.

Referring to FIGS. 2 and 5, the reverse prism sheet 300 may be disposed between the display panel DP and the optical path adjustment member 200. The reverse prism sheet 300 includes the support member 310 and the plurality of prism mountains 320 protruding from the support member 310 in a direction of the optical path adjustment member 200.

In an exemplary embodiment, each of the support member 310 and the plurality of prism mountains 320 may include at least one of an acrylic-based resin, a fluorine-based resin, a silicon-based resin, a polycarbonate-based resin, a polyamide-based resin, a polystyrene-based resin, a polyvinyl chloride-based resin, a polyester-based resin, a polyolefin-based resin, a polyethylene-based resin, a polypropylene-based resin, and a polybutylene-based resin, for example.

In detail, each of the prism mountains 320 includes a first inclined surface 321 and a second inclined surface 322. The first inclined surface 321 may be connected to the support member 310 and have a first acute angle C1 with respect to the flat portion 210. The second inclined surface 322 may be connected to the support member 310 and disposed father from the first side surface S1 than the first inclined surface 321 in the first direction DR1. Also, the second inclined surface 322 may have a second acute angle C2 with respect to the flat portion 210.

According to an exemplary embodiment, the prism mountains 320 may have the same shape. In an exemplary embodiment, for example, each of the prism mountains 320 may have an acute-angled triangular shape. Also, the first acute angle C1 and the second acute angle C2 may be the same with each other. However, the technical ideas of the invention are not limited thereto. In another exemplary embodiment, the first acute angle C1 and the second acute C2 may be different from each other, for example.

As illustrated in FIG. 5, each of the first and second inclined surfaces 321 and 322 may define an inverted triangular shape. In this case, light provided at a predetermined angle from the optical path adjustment member 200 may pass through the first inclined surface 321. Thereafter, the light passing through the first inclined surface 321 may be totally reflected by the second inclined surface 322 and then outputted in the third direction DR3.

The total reflection characteristic of the reverse prism sheet 300 may be changed according to a refractive index of the reverse prism sheet 300 and the conditions of the first and second acute angles C1 and C2. In an exemplary embodiment, the light transmitted from the optical path adjustment member 200 may be transmitted to the first inclined surface 321, for example, because air has a refractive index less than that of the reverse prism sheet 300. Thus, the total reflection may not occur.

When the light passing through the first inclined surface 321 is refracted by the second inclined surface 322, the total reflection may occur because the second inclined surface 322 has a refractive index greater than that of air. In an exemplary embodiment, the air may have a refractive index of 1, and the reverse prism sheet 300 may have a refractive index of about 1.45 to about 1.65, for example.

As described above, the light outputted from the flat portion 210 may be incident through the first inclined surface 321 and then totally reflected by the second inclined surface 322 and outputted to the display panel DP.

Also, according to an exemplary embodiment of the invention, the support member 310 and a prism mountain mold may be provided in a process of forming the reverse prism sheet 300. The prism mountain mold may be a mold for forming the plurality of prism mountains 320 and have a shape corresponding to the plurality of prism mountains to be formed. Thereafter, the support member 310 and the prism mountain mold may be coupled to each other, and then a resin may be filled into a space between the support member 310 and the prism mountain mold. Then, processes such as squeezing and curing may be performed to demold the support member 310 and the prism mountain mold. Thus, since the cured resin is coupled to the support member 310, the plurality of prism mountains 320 may be formed.

According to another exemplary embodiment, the support member 310 and the plurality of prism mountains 320 may be integrated with each other. In this case, a mold structure for forming the reverse prism sheet 300 may be prepared, and then, a resin may be injected into the mold structure and cured to form the independent reverse prism sheet 300.

Figure 6:
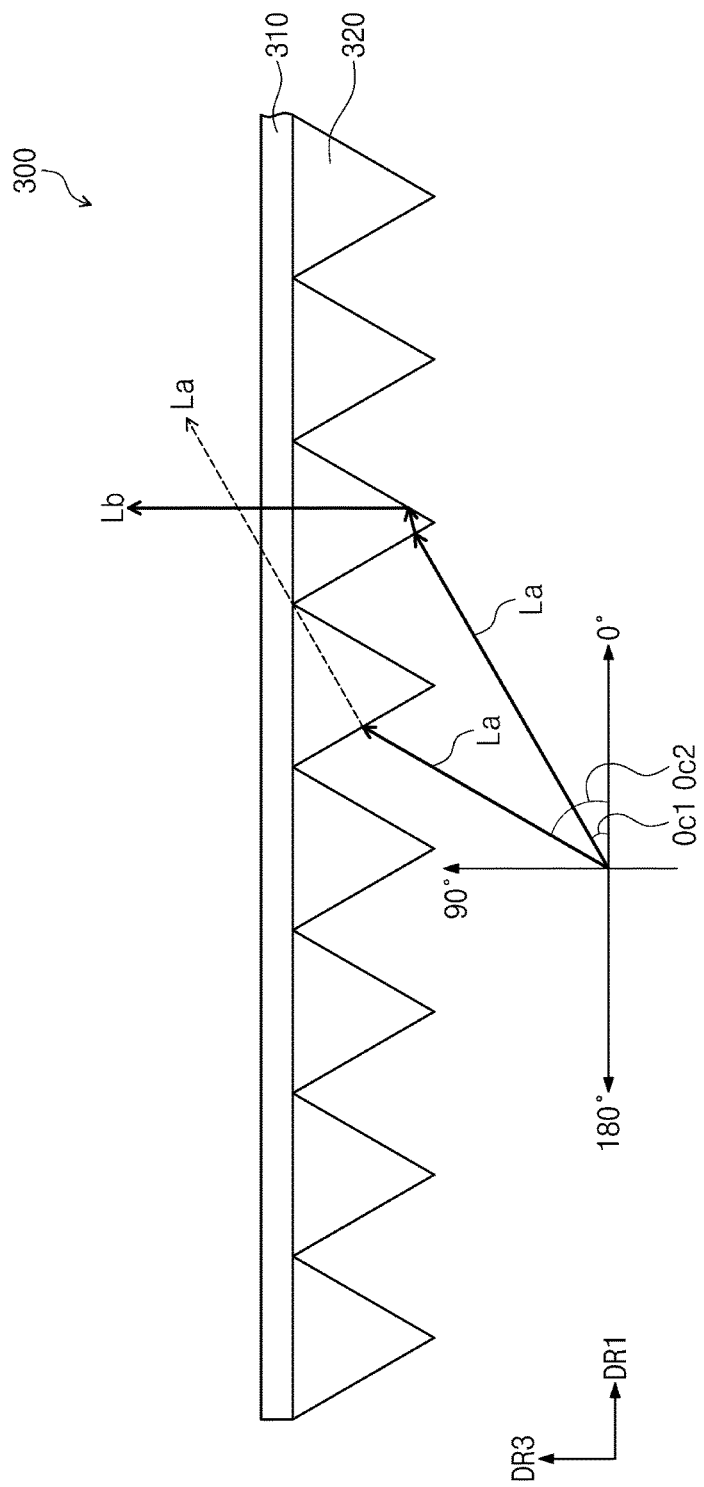
FIG. 6 is a view illustrating an example of a path of light traveling to a general reverse sheet.

FIG. 6 is a view illustrating an example of a path of light traveling to a general reverse sheet.

Referring to FIG. 6, when light is directly transmitted from the light guide member 100 (refer to FIGS. 1 and 2) to the reverse prism sheet 300 without the optical path adjustment member, light, which is not perpendicular to the extension direction of the display panel, of the light outputted from the reverse prism sheet 300 may be outputted.

Referring to FIGS. 5 and 6, in an exemplary embodiment, first emitted light La having a first angle Oc1 with respect to the light emission surface of the light guide member may be outputted, for example. In this case, although the first emitted light La reaches the first inclined surface 321, but does not reach the second inclined surface 322 and be outputted from the reverse prism sheet 300. As a result, the first emitted light La may be outputted in a direction that is not perpendicular to the extension direction of the display panel and thus may not be provided to the color conversion area corresponding to the corresponding pixel area, but be transmitted to the different color conversion area. Thus, display quality may be deteriorated.

The reverse prism sheet 300 according to an exemplary embodiment of the invention may allow the light emitted at a predetermined angle from the flat portion 210 through the optical path adjustment member 200 to be provided to the first inclined surface 321. As a result, the light provided to the first inclined surface 321 through the optical path adjustment member 200 may be provided to the second inclined surface 322 and totally reflected upward. Accordingly, the totally reflected light Lb may be emitted in the third direction DR3

Figure 7:
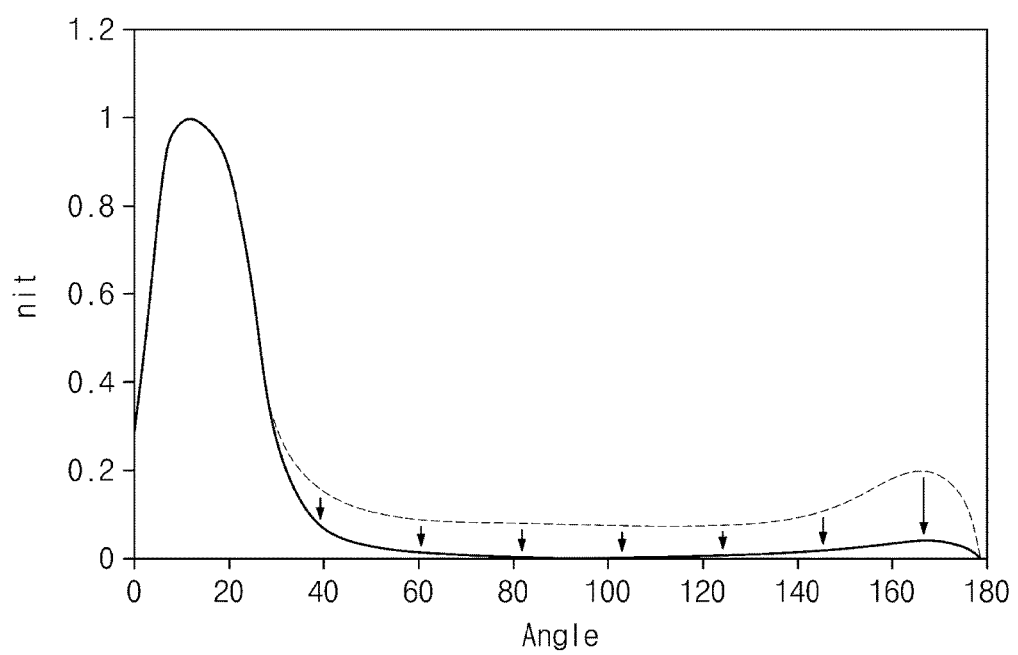
FIG. 7 is a graph illustrating brightness characteristics depending on an incident angle of light outputted from an exemplary embodiment of a light guide member according to the invention.

FIG. 7 is a graph illustrating brightness characteristics depending on an incident angle of light emitted from the light guide member according to an exemplary embodiment of the invention. Referring to FIGS. 2 and 7, a horizontal axis represents an inclined angle Yo (refer to FIG. 4) of the second surface 222 (refer to FIG. 4) with respect to the light emission surface OS (refer to FIG. 4), and a vertical axis represents brightness of light outputted from the reverse prism sheet 300 (refer to FIGS. 1, 2 and 6).

As described above, the inclined angle of the second surface 222 with respect to the light emission surface OS may be about 5 degrees to about 60 degrees, for example. As described above, when the light having the inclined angle of about 5 degrees to about 60 degrees with respect to the light emission surface OS is provided to the first inclined surface 321 of the reverse prism sheet 300, the light may be totally reflected by the second inclined surface 332, for example. However, in general, when the light having an inclined angle of about 60 degrees with respect to the light emission surface OS is provided to the first inclined surface 321, the light may be totally reflected by the second inclined surface 322. As a result, the light outputted from the light emission surface OS at an angle equal to or greater than about 60 degrees may be outputted from the reverse prism sheet 300 in a diagonal direction, but not in the direction that is perpendicular to the extension direction of the display panel DP.

As illustrated in FIGS. 6 and 7, when the optical path adjustment member 200 is not provided, the brightness of the light outputted from the light emission surface OS at an angle of about 60 degrees to about 180 degrees may have a first value (e.g., 0.2). The light having the first value (e.g., 0.2) may be generally transmitted from the reverse prism sheet 300 to the display panel DP in the diagonal direction.

Thus, the optical path adjustment member 200 according to an exemplary embodiment of the invention may block the light outputted from the light emission surface OS at the angle of about 60 degrees to about 180 degrees through the light blocking layer 230. As a result, the light outputted from the light emission surface OS at the angle of about 60 degrees to about 180 degrees may be reduced in brightness.

Figure 8A:
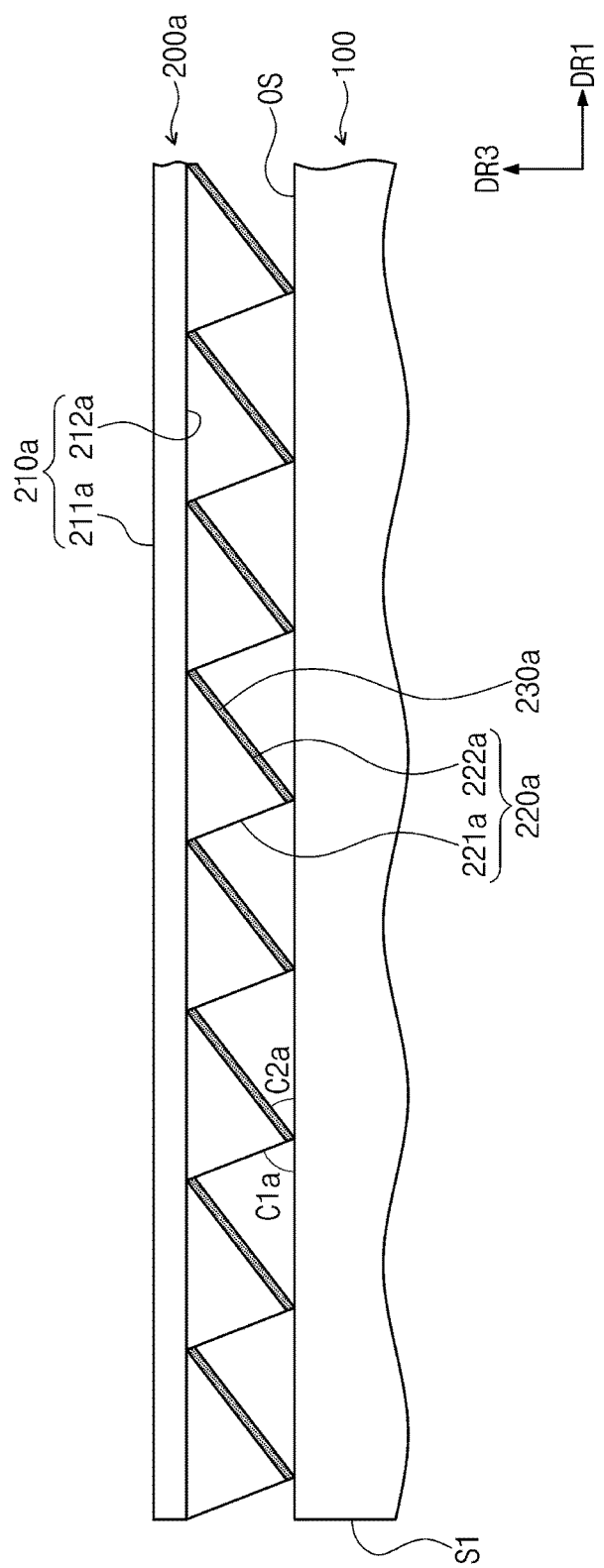
FIGS. 8A to 8C are cross-sectional views of another exemplary embodiment of an optical path adjustment member according to the invention.
Figure 8B:
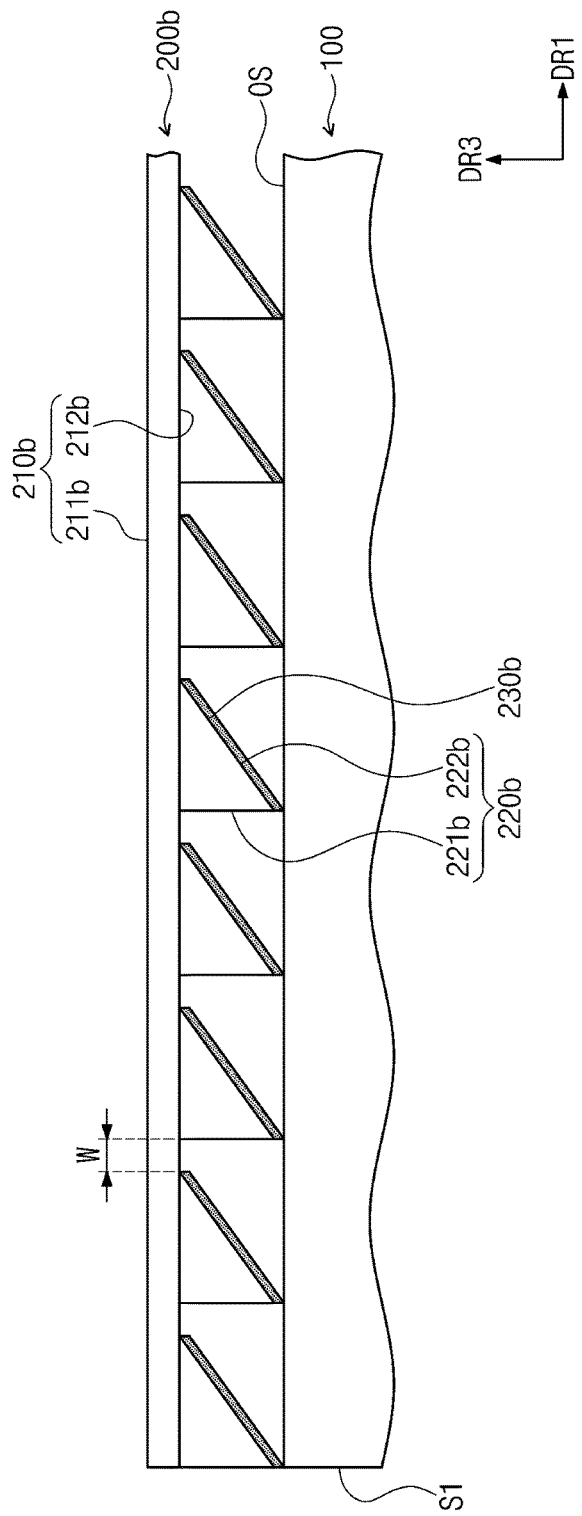
Figure 8C:
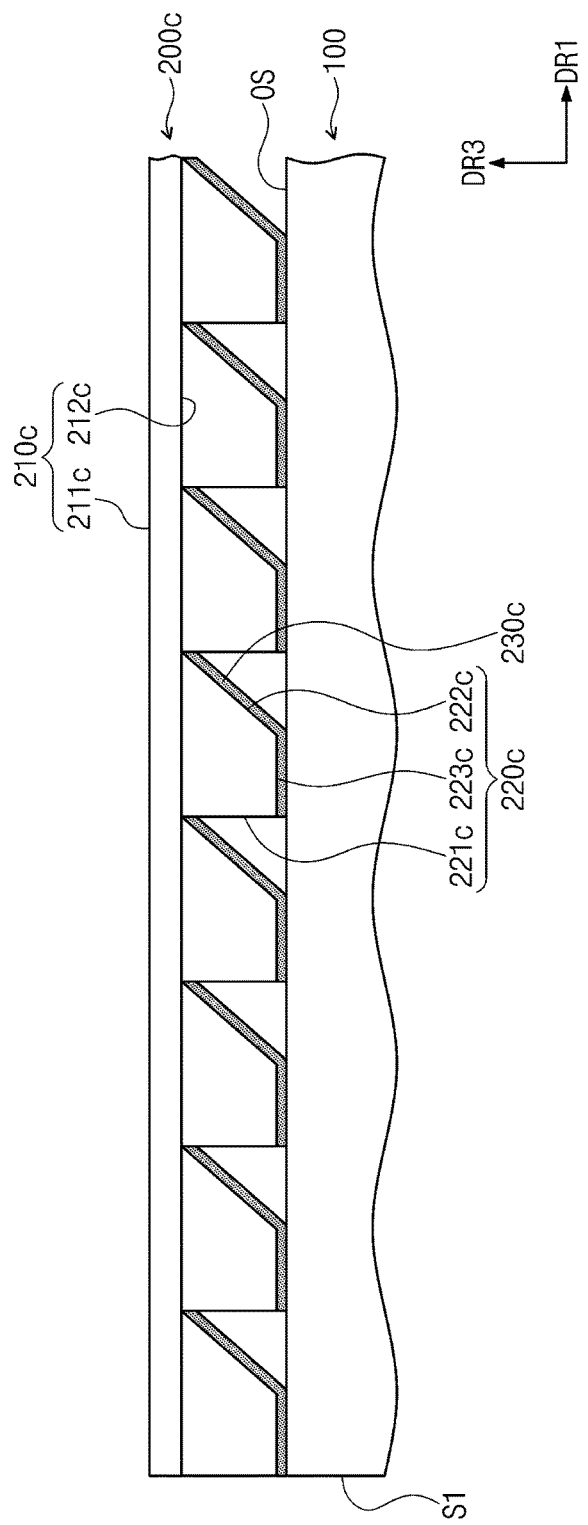

FIGS. 8A to 8C are cross-sectional views of an optical path adjustment member according to another exemplary embodiment of the invention.

Referring to FIGS. 8A to 8C, optical path adjustment members 200a to 200c may be substantially the same as the optical path adjustment member 200 of FIG. 4 except for protruding portions 220. Thus, descriptions with respect to other constituents will be omitted.

First, referring to FIG. 8A, a first surface 221a of the protruding portions 220a may be connected to a bottom surface 212a of a flat portion 210a and have a first acute angle C1a with respect to a light emission surface OS. A second surface 222a of the protruding portions 220a may be connected to the bottom surface 212a and disposed farther from a first side surface S1 than a first inclined surface 321 in the first direction DR1. Also, the second surface 222a may have a second acute angle C2a with respect to the light emission surface OS. Also, the first acute angle C1a and the second acute angle C2a may be different from each other. The top surface 211a and the light blocking layer 230a the may be similar to the top surface 211 and the light blocking layer 230 of FIG. 4, respectively, and detailed descriptions thereof will be omitted.

Referring to FIG. 8B, when compared to the protruding portions of FIG. 4, the protruding portions 220b of FIG. 8B may be spaced apart from each other by a predetermined distance W in the first direction DR1 and disposed on the flat portion 210b. In this case, the protruding portions 220b may be spaced apart from each other by the same distance. The top surface 211b, the bottom surface 212b, the first surface 221b, the second surface 222b, and the light blocking layer 230b may be similar to top surface 211, the bottom surface 212, the first surface 221, the second surface 222, and the light blocking layer 230 of FIG. 4, respectively, and detailed descriptions thereof will be omitted.

Referring to FIG. 8C, when compared to the protruding portions of FIG. 4, the protruding portions 220c of FIG. 8C may further include a third surface 223c connecting a first surface 221c to a second surface 222c. That is, the third surface 223c may be parallel to the first direction DR1 to contact the light emission surface OS. The protruding portions may have a trapezoid shape in a cross-section defined by the first and third directions DR1 and DR3. The flat portion 210c, the top surface 211c, the bottom surface 212c, and the light blocking layer 230c may be similar to the flat portion 210, the top surface 211, the bottom surface 212, and the light blocking layer 230 of FIG. 4, respectively, and detailed descriptions thereof will be omitted.

According to the exemplary embodiments of the invention, the light outputted from the light guide member may be incident into the reverse prism sheet in the constant direction by the optical path adjustment member. As a result, the light may be uniformly provided to the reverse prism sheet in the normal direction.

Thus, the light controlled by the liquid crystal layer may be prevented from being provided to the color conversion layer disposed on the different area to improve the overall display quality of the display device.

Hereinabove, the exemplary embodiments are disclosed in the drawings and the specification. While specific terms were used, they were not used to limit the meaning or the scope of the invention described in claims, but merely used to explain the invention. Accordingly, a person having ordinary skill in the art will understand from the above that various modifications and other equivalent embodiments are also possible. Hence, the real protective scope of the invention shall be determined by the technical scope of the accompanying claims.

What is claimed is:

1. A display device comprising:
   a display panel; and
   a backlight unit which is disposed below the display panel, provides light to the display panel, and comprises:
   a light guide member comprising a light emission surface, a reflection surface, and a plurality of side surfaces which connect the light emission surface to the reflection surface, wherein the plurality of side surfaces comprises a first side surface which receives light and a second side surface facing the first side surface in a first direction;
   a light source which provides the light to the first side surface;
   an optical path adjustment member disposed on the light guide member and comprising a flat portion, a plurality of protruding portions protruding from the flat portion in a direction to the light guide member, and a light blocking layer disposed on the plurality of protruding portions; and
   a prism sheet disposed on the flat portion,
   wherein each of the plurality of protruding portions comprises a first surface connected to the flat portion and a second surface which is disposed farther from the first side surface than the first surface in the first direction, connected to the flat portion, and has an acute angle with respect to the light emission surface, and the light blocking layer is disposed on at least the second surface.

2. The display device of claim 1, wherein the first surface has a right angle with respect to the light emission surface.

3. The display device of claim 2, wherein the acute angle ranges from about 5 degrees to about 60 degrees.

4. The display device of claim 1, wherein the plurality of protruding portions is arranged in the first direction, and the first direction and a second direction crossing the first direction define the light emission surface, and
   a thickness direction of the optical path adjustment member is defined as a third direction, and the plurality of protruding portions has the same shape with each other in a cross-section defined by the first and third directions.

5. The display device of claim 4, wherein each of the plurality of protruding portions has an acute-angled triangular shape.

6. The display device of claim 4, wherein each of the plurality of protruding portions further comprises a third surface which connects the first surface to the second surface and contacts the light emission surface.

7. The display device of claim 6, wherein the third surface has a trapezoid shape.

8. The display device of claim 4, wherein adjacent protruding portions of the plurality of protruding portions are spaced apart from each other by a predetermined distance in the first direction, and predetermined distances between adjacent protruding portions of the plurality of protruding portions are the same with each other.

9. The display device of claim 1, wherein the light blocking layer comprises at least one of carbon black, iron oxide, chromium oxide, zirconium oxide, zinc or cerium oxide, manganese violet, blue ultramarine, chromium hydrates, and iron blue.

10. The display device of claim 1, wherein the prism sheet comprises a reverse prism sheet.

11. The display device of claim 10, wherein the reverse prism sheet comprises:
    a support member; and
    a plurality of prism mountains protruding in a direction of the optical path adjustment member on a plane of the support member.

12. The display device of claim 11, wherein each of the plurality of prism mountains comprises:
    a first inclined surface connected to the support member and having a first acute angle with respect to the flat portion; and
    a second inclined surface disposed farther from the first side surface than the first inclined surface in the first direction, connected to the support member, and having a second acute angle with respect to the flat portion.

13. The display device of claim 12, wherein the plurality of prism mountains is arranged in the first direction, and the first direction and a second direction crossing the first direction define the flat portion, and
    a thickness direction of the reverse prism sheet is defined as a third direction perpendicular to the first and second directions, and the plurality of prism mountains have the same shape with each other in a cross-section defined by the first and third direction.

14. The display device of claim 13, wherein each of the plurality of prism mountains has an acute-angled triangular shape.

15. The display device of claim 1, wherein the display panel comprises:
    a first substrate disposed on the backlight unit;
    a display layer disposed on the first substrate;
    a color conversion layer disposed on the display layer and comprising a light excitation material; and
    a second substrate disposed on the display layer.

16. The display device of claim 1, wherein the light source generates blue light.

* * * * *